(12) United States Patent
Jung et al.

(10) Patent No.: US 8,379,046 B2
(45) Date of Patent: Feb. 19, 2013

(54) METHOD AND APPARATUS FOR RENDERING

(75) Inventors: Seok-yoon Jung, Seoul (KR); Sang-oak Woo, Anyang-si (KR); Kwon-teak Kwon, Seoul (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 772 days.

(21) Appl. No.: 12/078,045

(22) Filed: Mar. 26, 2008

(65) Prior Publication Data

US 2009/0167777 A1 Jul. 2, 2009

(30) Foreign Application Priority Data

Dec. 28, 2007 (KR) .................. 10-2007-0140675

(51) Int. Cl.
*G09G 5/02* (2006.01)
(52) U.S. Cl. ........ 345/592; 345/422; 345/582; 345/589; 345/614; 345/620; 345/506
(58) Field of Classification Search ........................ None
See application file for complete search history.

(56) References Cited

U.S. PATENT DOCUMENTS

| 6,791,558 | B2 * | 9/2004 | Park et al. ............... | 345/556 |
| 6,891,533 | B1 * | 5/2005 | Alcorn et al. ............. | 345/419 |
| 7,068,272 | B1 | 6/2006 | Voorhies et al. | |
| 7,256,796 | B1 * | 8/2007 | Bastos et al. ............. | 345/614 |
| 7,425,967 | B2 * | 9/2008 | Jeong ..................... | 345/614 |
| 2005/0195198 | A1 | 9/2005 | Anderson et al. | |
| 2005/0195199 | A1 | 9/2005 | Anderson et al. | |
| 2007/0273689 | A1 * | 11/2007 | Tsao ...................... | 345/422 |
| 2008/0106551 | A1 * | 5/2008 | Jung et al. ............... | 345/506 |

FOREIGN PATENT DOCUMENTS

| KR | 10-2003-0006212 | 1/2003 |
| KR | 10-2004-0011918 | 2/2004 |
| KR | 10-2006-0044124 | 5/2006 |

OTHER PUBLICATIONS

Segal et al. "The OpenGL Graphics System: A Specification (Version 1.1)" Copyright 1992-1997, Silicon Graphics, Inc. Section 3.8 Accessed on the web via http://www.opengl.org/documentation/specs/version1.1/glspec1.1/index.html.*
"Alpha compositing" from Wikipedia the Free Encyclopedia, http://en.wikipedia.org/wiki/Alpha_compositing (printed on Sep. 12, 2011).
Ned Greene et al., "Hierarchical Z-Buffer Visibility," seven pages, undated.
Emmett Kilgariff et al., "The GeForce 6 Series GPU Architecture," Chapter 30, Excerpted from GPU Gems 2 Copyright 2005 by NVIDIA Corporation, pp. 471-491 (22 pages total).
Joel McCormack et al., "Neon: A (Big) (Fast) Single-Chip 3D Workstation Graphics Accelerator," Western Research Laboratory, Revised Jul. 1999, pp. 1-21 (23 pages total).

(Continued)

*Primary Examiner* — Antonio A Caschera
(74) *Attorney, Agent, or Firm* — Staas & Halsey LLP

(57) ABSTRACT

A rendering method and apparatus capable of allowing power to be efficiently used and rendering to be quickly completed. The rendering method includes: performing texture mapping of a transparency value of a fragment; testing whether or not the fragment can be expressed as a pixel after the performing of the texture mapping; and selectively performing texture mapping of the color value of the fragment according to the test result.

16 Claims, 2 Drawing Sheets

OTHER PUBLICATIONS

Woo-Chan Park et al., "An Effective Pixel Rasterization Pipeline Architecture for 3D Rendering Processors," IEEE Transactions on Computers, vol. 52, No. 11, Nov. 2003, pp. 1501-1508.

Steve Morein, "ATI Radeon HyperZ Technology," Radeon Graphics, 21 pages, undated.

* cited by examiner

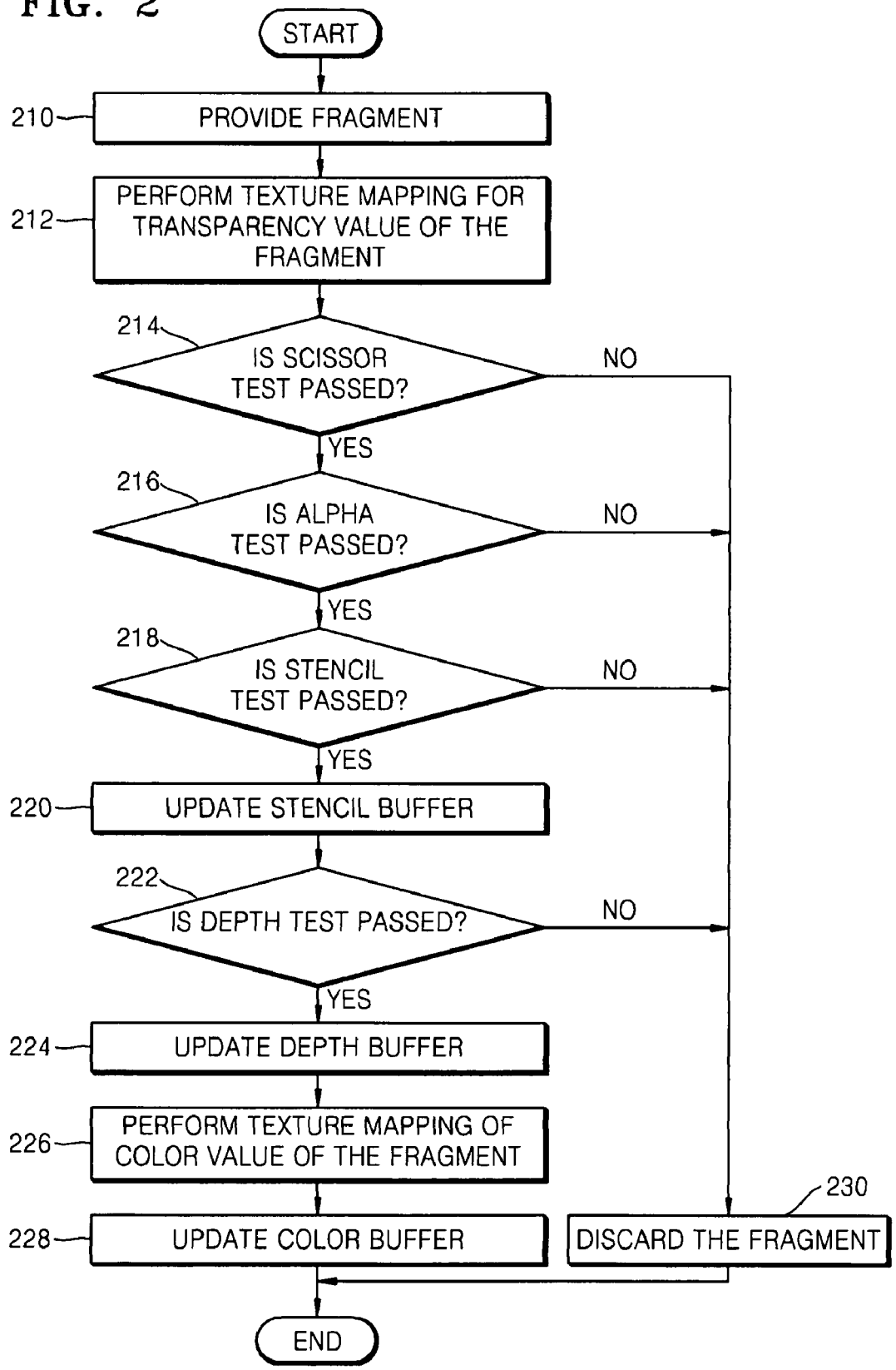

METHOD AND APPARATUS FOR RENDERING

CROSS-REFERENCE TO RELATED PATENT APPLICATIONS

This application claims the benefit of Korean Patent Application No. 10-2007-0140675, filed on Dec. 28, 2007, in the Korean Intellectual Property Office, the disclosure of which is incorporated herein in its entirety by reference.

BACKGROUND OF THE INVENTION

1. Field of the Invention

The present invention relates to rendering, and more particularly, to a 3-dimensional (3D) graphics accelerator performing rendering in a pipeline fashion.

2. Description of the Related Art

When performing rendering (i.e., visualization) of a model formed with a plurality of vertexes, a conventional rendering apparatus sequentially receives inputs of plurality of fragments generated in each plane formed by vertexes, and executes a plurality of graphic jobs for each of the input fragments. In this case, the graphics jobs may include one for expressing a fragment as a pixel, such as texture mapping, or one for testing whether or not a fragment can be expressed as a pixel, such as a depth test. The texture mapping is mapping a color value and transparency value of one location on a texture image which is a 2D image indicating material or texture, onto a fragment. The depth test is testing whether or not a fragment desired to be expressed can be expressed as a pixel, by comparing the depth value of the fragment desired to be expressed as a pixel, with a depth value which is prepared in advance for a matching location where the desired fragment can be expressed.

This conventional rendering apparatus performs the graphics job for testing whether or not a fragment can be expressed as a pixel, after performing texture mapping of the fragment. Accordingly, the conventional rendering apparatus unnecessarily performs texture mapping for even a fragment which would prove to be inexpressible as a pixel, thereby causing problems in managing efficient power consumption and fast rendering. This problem is more serious when more fragments that cannot be expressed as a pixel are included in fragments of any one model input to the conventional rendering apparatus.

SUMMARY OF THE INVENTION

The present invention provides a rendering method capable of allowing power to be efficiently used and rendering to be quickly completed.

The present invention also provides a rendering apparatus capable of allowing power to be efficiently used and rendering to be quickly completed.

The present invention also provides a computer readable recording medium having embodied thereon a computer program for executing a rendering method capable of allowing power to be efficiently used and rendering to be quickly completed.

According to an aspect of the present invention, there is provided a rendering method including: performing texture mapping of a transparency value of a fragment; testing whether or not the fragment can be expressed as a pixel after the performing of the texture mapping of the transparency value; and selectively performing texture mapping of the color value of the fragment according to the test result.

According to another aspect of the present invention, there is provided a rendering apparatus including: a first mapping unit performing texture mapping of a transparency value of a fragment; an expressibility test unit testing whether or not the fragment for which texture mapping is performed by the first mapping unit can be expressed as a pixel, and generating a control unit according to the test result; and a second mapping unit performing texture mapping of the color value of the fragment in response to the control signal According to another aspect of the present invention, there is provided a computer readable recording medium having embodied thereon a computer program for executing a rendering method wherein the method includes: performing texture mapping of a transparency value of a fragment; testing whether or not the fragment can be expressed as a pixel after the performing of the texture mapping of the transparency value; and selectively performing texture mapping of the color value of the fragment according to the test result.

BRIEF DESCRIPTION OF THE DRAWINGS

The above and other features and advantages of the present invention will become more apparent by describing in detail exemplary embodiments thereof with reference to the attached drawings in which:

FIG. 2 is a flowchart illustrating operations of a rendering method according to an embodiment of the present invention.

DETAILED DESCRIPTION OF THE INVENTION

Figure 1:
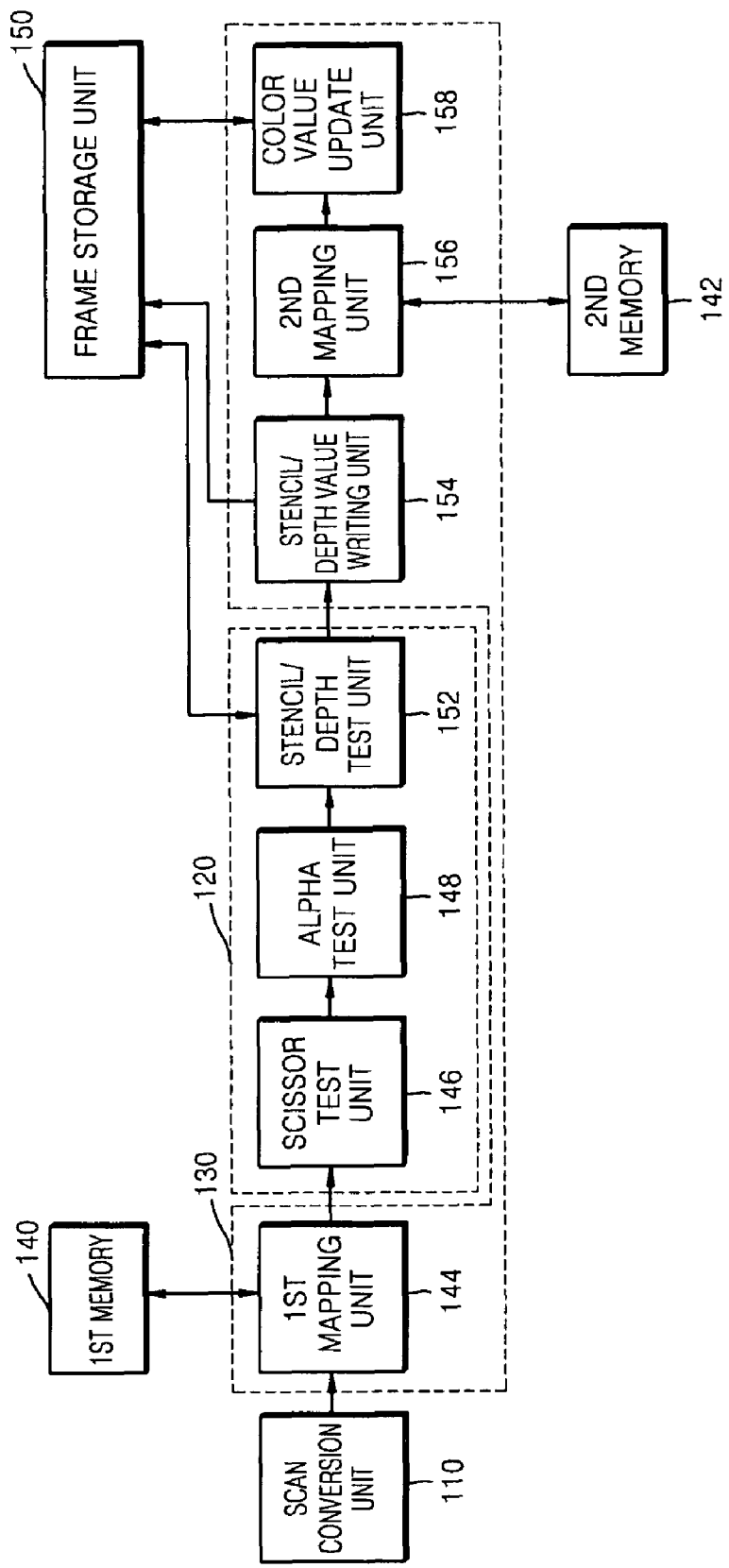
FIG. 1 is a block diagram illustrating a rendering apparatus according to an embodiment of the present invention.

The attached drawings for illustrating preferred embodiments of the present invention are referred to in order to gain a sufficient understanding of the present invention, the merits thereof, and the objectives accomplished by the implementation of the present invention. Hereinafter, the present invention will be described in detail by explaining preferred embodiments of the invention with reference to the attached drawings.

FIG. 1 is a block diagram illustrating a rendering apparatus according to an embodiment of the present invention. The rendering apparatus may include a scan conversion unit 110, an expressibility test unit 120, a fragment processing unit 130, a first memory 140, a second memory 142, and a frame storage unit 150. Hereinafter, for convenience of explanation, it is assumed that the expressibility test unit 120 is formed with a scissor test unit 146, an alpha test unit 148, a stencil/depth test unit 152, and the fragment processing unit is formed with a first mapping unit 144, a stencil/depth value writing unit 154,.a second mapping unit 156, and a color value update unit 158.

The rendering apparatus according to the current embodiment supports a pipeline structure as illustrated in FIG. 1. For example, the first mapping unit 144 operates after the scan conversion unit 110 operates; the scissor test unit 146 operates after the first mapping unit 144 operates; the alpha test unit 148 operates after the scissor test unit 146 operates; and the stencil/depth test unit 152 operates after the alpha test unit 148 operates. Likewise, the stencil/depth value writing unit 154 operates after the stencil/depth test unit 152 operates, and the color value update unit 158 operates after the second mapping unit 156 operates. Accordingly, the first mapping unit 144 through the color value update unit 158 as illustrated in FIG. 1 form one pipeline allowing a maximum of 7 operations, and this will be referred to as a pixel pipeline. In this case, the first operation means the operation of the first mapping unit 144 and the eighth operation means the operation of the color value update unit 158.

The scan conversion unit 110 generates a plurality of fragments for each of planes formed by vertexes forming a model which the rendering apparatus is desired to render. In this case, each vertex has position information, color information, and the like, and each fragment has information on the position on a screen of a pixel corresponding to the fragment, the depth value of the fragment, the color value of the fragment, texture coordinates corresponding to the fragment, and the like. The fragment is referred to as a pixel only after it is written in the frame storage unit 150 which will be explained later. A display apparatus (not shown) such as a liquid crystal display (LCD) displays the written pixel through a screen of the display apparatus. Accordingly, in the present specification, the pixel corresponding to the fragment means the fragment when it is assumed that the fragment is written in the frame storage unit 150; the screen means the screen disposed in the display apparatus; and texture coordinates mean the coordinates of one position on a texture image which is a 2D image indicating material or texture.

Meanwhile, each of the thus generated fragments is sequentially input to the pixel pipeline. In relation to a fragment for which a p-th stage of the pixel pipeline is performed, if the p-th operation is completed, a (p+1)-th stage for the fragment may be performed or the fragment may be discarded. If each stage of the pixel pipeline transfers a fragment to a next stage after the stage for the fragment is completed, then, if a p-th stage of the pixel pipeline for a fragment which is input for the q-th time (q is a natural number) is completed, the p-th stage is performed for a fragment which is input for the (q+1)-th time into the pixel pipeline. For example, if the first mapping unit 144 operates for a fragment which is input for the sixth time in the pixel pipeline and the operation is completed, the fragment input for the sixth time may be input to the scissor test unit 146 and the first mapping unit 144 operates for a fragment which is input for the seventh time into the pixel pipeline. Likewise, if the alpha test unit 148 operates for a fragment which is input for the second time into the pixel pipeline and completes the operation, the fragment input for the second time may be input to the stencil/depth test unit 152, and the alpha test unit 148 operates for a fragment which is input for the third time into the pixel pipeline.

Detailed operations of this pixel pipeline will now be explained.

The expressibility test unit 120 performs one or more raster jobs. In the present specification, the first raster job means one that tests whether or not a fragment can be expressed as a pixel. Operations of the scissor test unit 146, the alpha test unit 148, and the stencil/depth test unit 152 are examples of the first raster job. The expressibility test unit 120 performs the first raster job, and according to the performing result, generates a control signal. More specifically, the expressibility test unit 120 can generate a control signal if all of a scissor test of the scissor test unit 146, an alpha test of the alpha test unit 148, and a stencil test and a depth test of the stencil/depth test unit 152 are passed.

The fragment processing unit 130 performs one or more second raster jobs. In the present specification, the second raster job means one that is required to express a fragment as a pixel. Operations of the first mapping unit 144, the operation of the stencil/depth value writing unit 154, the second mapping unit 156, and the color value update unit 158 are examples of the second raster job. In this case, the second mapping unit 156 receives an input of a control signal from the expressibility test unit 120, and operates in response to the control signal.

More specific explanation on the expressibility test unit 120 and the fragment processing unit 130 will be replaced by the following explanation on operations of the first memory 140 through the depth value update unit 158.

The first memory 140 stores the transparency value (alpha value) of each of one or more texture images, and the second memory 142 stores the color value of each of the one or more texture images. Thus, the transparency values and the color values of texture images from among texture image information items are stored in separate memories. In the present specification, the transparency value may mean a number indicating the degree of transparency, and the color value may mean a combination of a red (R) component value, a green (G) component value, and a blue (B) component value.

The first mapping unit 144 performs texture mapping for the transparency value of a fragment input to the first mapping unit 144. More specifically, the first mapping unit 144 maps texture coordinates on a texture image stored in the first memory 140 onto the fragment input to the first mapping unit 144. By doing so, the transparency value in the texture coordinates is mapped onto the input fragment.

The first mapping unit 144 maps the transparency value onto the fragment input to the first mapping unit 144, and outputs the fragment onto which the transparency value is mapped, to the scissor test unit 146.

The scissor test unit 146 performs a scissor test for the fragment input to the scissor test unit 146. In this case, the scissor test for the fragment means testing of whether or not the position of a pixel corresponding to the fragment exists in an area specified in advance in a screen. That is, the display apparatus (not shown) does not display a pixel located other than an area specified in advance. The first stage and second stage of the pixel pipeline may be operations of the first mapping unit 144 and the scissor test unit 146, respectively, as illustrated in FIG. 1, or unlike as illustrated in FIG. 1, the first and second stages may be operations of the scissor test unit 146 and the first mapping unit 144, respectively.

If it is determined that the fragment input to the scissor test unit cannot pass the scissor test (fail), that is, if the position of the pixel corresponding to the input fragment does not exist in the area specified in advance, the scissor test unit 146 discards the input fragment. In the present specification, discarding of the fragment means not writing into the frame storage unit 150, which will be explained later, that is, not displaying the fragment as a pixel.

Meanwhile, if it is determined that the fragment input to the scissor test unit 146 passes the scissor test, that is, if it is determined that the position of the pixel corresponding to the input fragment exists in the area specified in advance, the scissor test unit 146 outputs the input fragment to the alpha test unit 148.

The alpha test unit 148 performs an alpha test for the fragment input to the alpha test unit 148. In this case, the alpha test of the fragment means comparing a reference transparency value specified by a user for the fragment with a transparency value mapped onto the fragment by the first mapping unit 144. The specific meaning of passing the alpha test may be set by the user. For example, passing the alpha test may mean the reference transparency value is greater or less than the mapped transparency value.

If it is determined that the fragment input to the alpha test unit 148 does not pass the alpha test, the alpha test unit 148 discards the input fragment.

If it is determined that the fragment input to the alpha test unit 148 passes the alpha test, the alpha test unit 148 outputs the input fragment to the stencil/depth test unit 152.

The frame storage unit 150 stores the pixel value of each pixel that can be expressed on the screen. In this case, the pixel value may be a stencil value, or a depth value, or a color value. In this case, the color value includes a color value and a transparency value. For this, the frame storage unit 150 may include a stencil buffer (not shown), a depth buffer (not shown), and a color buffer (not shown). Here, the stencil buffer stores the stencil value of each pixel that can be expressed on the screen, the depth buffer stores the depth value, and the color buffer stores the color value. This pixel value is a value that can be acquired from a fragment, and if the acquired pixel is written in the frame storage unit 150, the fragment is referred to as a pixel. The display apparatus (not shown) displays the pixel according to the written pixel value. Accordingly, the expression 'a fragment is expressed as a pixel' in the present specification means acquiring a pixel value and writing the acquired pixel value in the stencil buffer, the depth buffer, and the color buffer.

The stencil/depth test unit 152 performs a stencil test for the fragment input to the stencil/depth test unit 152.

The stencil test is comparing a stencil value specified by the user for the fragment input to the stencil/depth test unit 152 with a stencil value stored in the stencil buffer for a matching location at which the fragment can be expressed. Specific meaning of passing the stencil test may be set by the user. For example, passing the stencil test may mean the reference stencil value is greater or less than the stored stencil value.

If it is determined that the fragment input to the stencil/depth unit 152 does not pass the stencil test, the stencil/depth unit 152 discards the input fragment.

If it is determined that the fragment input to the stencil/depth unit 152 passes the stencil test, the stencil/depth test unit 152 outputs the input fragment to the stencil/depth value writing unit 154. The stencil/depth value writing unit 154 writes in the frame storage unit 150 the reference stencil value specified by the user for the fragment input to the stencil/depth value writing unit 154. More specifically, if the fragment input to the stencil/depth value writing unit 154 is a fragment passing the stencil test, the stencil/depth value writing unit 154 writes in the stencil buffer (not shown) the reference stencil value as a stencil value corresponding to a location on the screen at which the input fragment will be displayed. By doing so, a stencil value stored in the stencil buffer is updated.

Also, if it is determined that the fragment input to the stencil/depth test unit 152 passes the stencil test, the stencil/depth test unit 152 performs a depth test for the input fragment.

The depth test is comparing the depth value of the fragment with a depth value stored in the depth buffer (not shown) for a matching location at which the fragment can be expressed. Specific meaning of passing the depth test may be set by the user. For example, passing the depth test may mean the depth value of the fragment is greater or less than the stored depth value.

If it is determined that the fragment input to the stencil/depth unit 152 does not pass the depth test, the stencil/depth unit 152 discards the input fragment.

If it is determined that the fragment input to the stencil/depth unit 152 passes the depth test, the stencil/depth test unit 152 outputs the input fragment to the stencil/depth value writing unit 154. The stencil/depth value writing unit 154 writes in the frame storage unit 150 the depth value specified by the user for the fragment input to the stencil/depth value writing unit 154. More specifically, if the fragment input to the stencil/depth value writing unit 154 is a fragment passing the depth test, the stencil/depth value writing unit 154 writes in the depth buffer (not shown) the depth value of the input fragment as a depth value corresponding to a location on the screen at which the input fragment will be displayed. By doing so, a depth value stored in the stencil buffer is updated.

Also, if it is determined that the fragment input to the stencil/depth test unit 152 passes the depth test, the stencil/depth test unit 152 outputs the input fragment to the second mapping unit 156.

The second mapping unit 156 performs texture mapping for the color value of the input fragment. More specifically, the second mapping unit 156 maps the texture coordinates of a texture image stored in the second memory 142 onto the fragment input to the second mapping unit 156. By doing so, the color value at the texture coordinates is mapped onto the input fragment.

After mapping the color value onto the fragment input to the second mapping unit 156, the second mapping unit 156 outputs the fragment onto which the color value is mapped, to the color value update unit 158.

The color value update unit 158 updates a transparency value and color value stored in the color buffer (not shown) corresponding to a location at which the input fragment is to be displayed on the screen, by considering the transparency value mapped onto the input fragment by the first mapping unit 144 and the color value mapped onto the input fragment by the second mapping unit 156.

Accordingly, when texture mapping for a fragment input to the pixel pipeline is performed, the rendering apparatus according to the current embodiment does not perform texture mapping for the transparency value and color value of the fragment together, but performs texture mapping for the transparency value of the fragment, and then, only after at least one of the first raster jobs and second raster jobs that do not require the color value of the fragment, the rendering apparatus performs texture mapping for the color value of the fragment. Thus, the rendering apparatus according to the current embodiment performs texture mapping for a color value for only a fragment that is determined to be expressed as a pixel by the expressibility text unit 120, and therefore texture mapping for the color value of a fragment to be discarded without being expressed as a pixel is not performed and the fragment can be discarded. Accordingly, unnecessary power consumption can be minimized while rendering can be performed quickly.

FIG. 2 is a flowchart illustrating operations of a rendering method according to an embodiment of the present invention, which may include operations 210 through 230 allowing power to be efficiently used and rendering to be quickly completed.

A fragment is input to a pixel pipeline in operation 210, and the mapping unit 144 performs texture mapping for the transparency value of the fragment input in operation 210 in operation 212.

The scissor test unit 146 tests whether or not the fragment for which operation 212 is performed passes a scissor test in operation 214.

If it is determined in operation 214 that the fragment passes the scissor test, the alpha test unit 148 tests whether or not the fragment for which operation 214 is performed passes an alpha test in operation 216.

If it is determined in operation 216 that the fragment passes the alpha test, the stencil/depth test unit 152 tests whether or not the fragment for which operation 216 is performed passes a stencil test in operation 218.

If it is determined in operation 218 that the fragment passes the stencil test, the stencil/depth writing unit 154 updates a stencil value stored in the stencil buffer (not shown) in operation 220.

The stencil/depth test unit 152 tests whether or not the fragment for which operation 218 is performed passes a depth test in operation 222.

If it is determined in operation 222 that the fragment passes the depth test, the stencil/depth writing unit 154 updates a depth value stored in the depth buffer (not shown) in operation 224.

The second mapping unit 156 performs texture mapping for the color value of the fragment for which operation 220 is performed in operation 226.

The color value update unit 158 updates a color value stored in the color buffer (not shown) corresponding to a location at which the fragment for which operation 226 is performed is to be displayed, by considering the color value of the fragment for which operation 226 is performed in operation 228.

Meanwhile, if it is determined in operation 214 that the fragment does not pass the scissor test, or if it is determined in operation 216 that the fragment does not pass the alpha test, or if it is determined in operation 218 that the fragment does not pass the stencil test, or if it is determined in operation 222 that the fragment does not pass the depth test, the pixel pipeline discards the fragment in operation 230.

The present invention can also be embodied as computer readable codes on a computer readable recording medium. The computer readable recording medium is any data storage device that can store data which can be thereafter read by a computer system. Examples of the computer readable recording medium include read-only memory (ROM), random-access memory (RAM), CD-ROMs, magnetic tapes, floppy disks, and optical data storage devices, such as digital versatile discs (DVDs).

While the present invention has been particularly shown and described with reference to exemplary embodiments thereof, it will be understood by those of ordinary skill in the art that various changes in form and details may be made therein without departing from the spirit and scope of the present invention as defined by the following claims. The preferred embodiments should be considered in descriptive sense only and not for purposes of limitation. Therefore, the scope of the invention is defined not by the detailed description of the invention but by the appended claims, and all differences within the scope will be construed as being included in the present invention.

What is claimed is:

1. A rendering method comprising:
   performing texture mapping of a transparency value of a texture image onto an input fragment using a computer;
   testing whether the input fragment can be expressed as a pixel after the performing of the texture mapping of the transparency value of the texture image onto the input fragment; and
   selectively performing texture mapping of a color value of the texture image onto the input fragment according to the test result,
   wherein, for each of a plurality of input fragments, the performing of texture mapping of a transparency value of each of the plurality of input fragments is performed sequentially for each of the plurality of input fragments.

2. The method of claim 1, wherein the transparency value of the texture image is a value which is read from a first memory, and the color value of the texture image is a value which is read from a second memory.

3. The method of claim 1, wherein the testing of whether the input fragment can be expressed as a pixel is performed by sequentially performing jobs testing whether the input fragment can be expressed as a pixel, and the performing of the texture mapping of the color value is selectively performed according to the test results of the jobs.

4. The method of claim 3, wherein the jobs comprises at least one of a scissor test, an alpha test, a stencil test, and a depth test.

5. The method of claim 1, wherein in the selectively performing of texture mapping of the color value of the texture image onto the input fragment according to the test result, if it is determined that the input fragment can be expressed as a pixel, texture mapping of the color value of the texture image onto the input fragment is performed.

6. The method of claim 2, wherein the color value of the texture image is not stored in the first memory.

7. A non-transitory computer readable recording medium having embodied thereon a computer program for executing any one of the method of claims 1 through 5.

8. A rendering apparatus comprising:
   a first mapping unit to perform texture mapping, using a computer, of a transparency value of a texture image onto an input fragment;
   an expressibility test unit to test whether the input fragment for which texture mapping of the transparency value is performed by the first mapping unit can be expressed as a pixel, and to generate a control signal according to the test result;
   a second mapping unit to selectively perform texture mapping of a color value of the texture image onto the input fragment in response to the control signal; and
   a first memory, wherein the transparency value of the texture image is a value which is read from the first memory,
   wherein a plurality of the input fragments are sequentially input to the first mapping unit.

9. The apparatus of claim 8, wherein the color value of the texture image is a value which is read from a second memory.

10. The apparatus of claim 8, wherein the expressibility test unit sequentially performs jobs testing whether the input fragment can be expressed as a pixel, and generates the control signal according to the test results of the jobs.

11. The apparatus of claim 10, wherein the jobs comprises at least one of a scissor test, an alpha test, a stencil test, and a depth test.

12. The apparatus of claim 8, wherein the color value of the texture image is not stored in the first memory.

13. A rendering method comprising:
   performing texture mapping of a transparency value of a texture image onto an input fragment using a computer;
   testing whether the input fragment can be expressed as a pixel after the performing of the texture mapping of the transparency value of the texture image onto the input fragment; and
   selectively performing texture mapping of a color value of the texture image onto the input fragment according to the test result,
   wherein texture mapping of the color value of the texture image onto the input fragment is performed if all of a scissor test, alpha test, stencil test, and a depth test are passed.

14. The method of claim 13, wherein the transparency value of the texture image is a value which is read from a first memory, and the color value of the texture image is a value which is read from a second memory.

15. A rendering apparatus comprising:
a first mapping unit to perform texture mapping, using a computer, of a transparency value of a texture image onto an input fragment;
an expressibility test unit to test whether the input fragment for which texture mapping of the transparency value is performed by the first mapping unit can be expressed as a pixel, and to generate a control signal according to the test result;
a second mapping unit to selectively perform texture mapping of a color value of the texture image onto the input fragment in response to the control signal; and
a first memory, wherein the transparency value of the texture image is a value which is read from the first memory,
wherein the second mapping unit performs texture mapping of the color value of the texture image onto the input fragment if all of a scissor test, alpha test, stencil test, and a depth test are passed.

16. The apparatus of claim 15, wherein the color value of the texture image is a value which is read from a second memory.

* * * * *